I. D. POWELL.
ELBOW FORMER ATTACHMENT FOR PIPE VISES.
APPLICATION FILED SEPT. 1, 1909.
998,924.
Patented July 25, 1911.
2 SHEETS—SHEET 1.
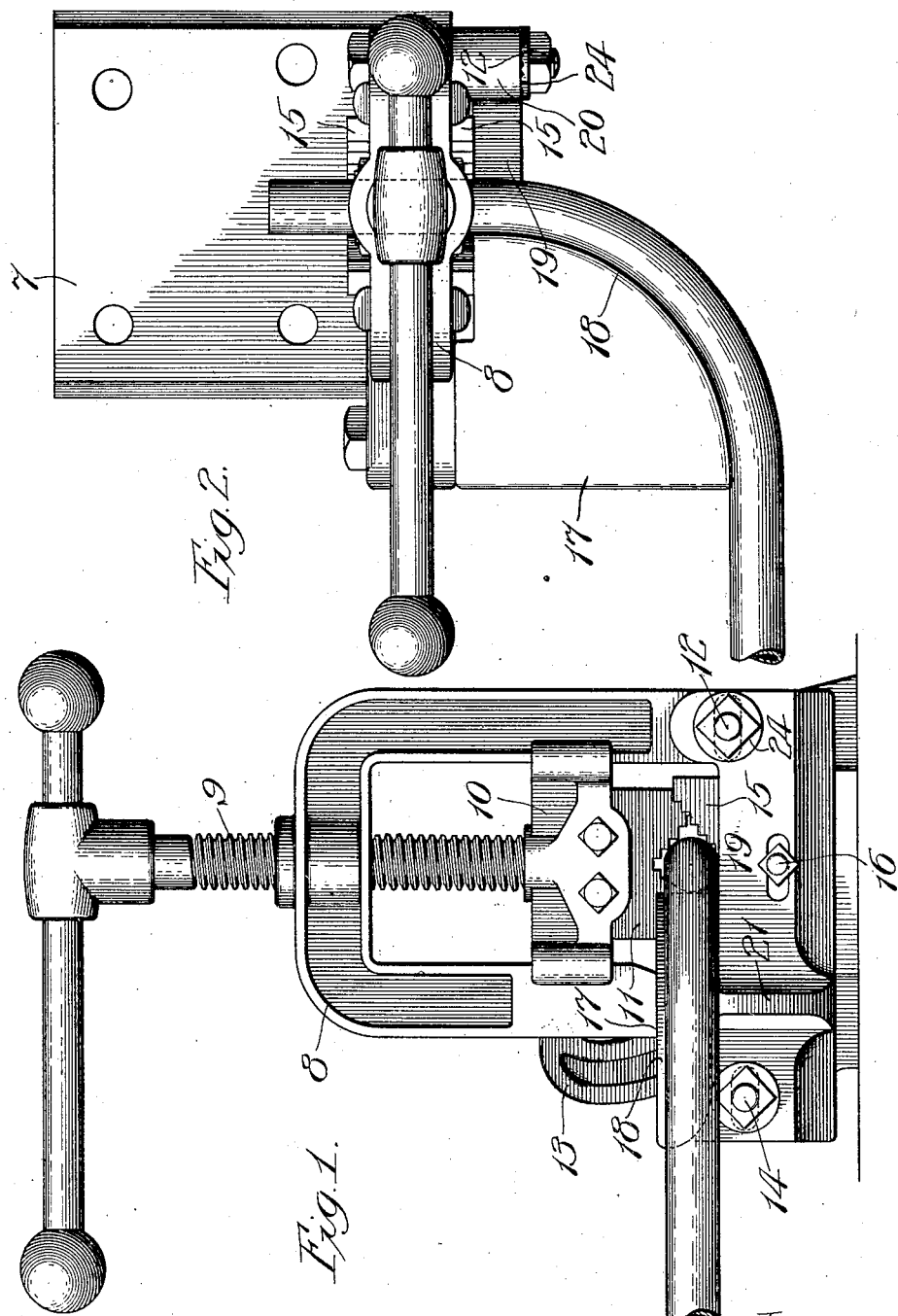
Witnesses:
John Enders
Chas. H. Buell
Inventor:
Ira D. Powell,
By Dyrenforth, Lee, Chritton & Wiles
Attys.

I. D. POWELL.
ELBOW FORMER ATTACHMENT FOR PIPE VISES.
APPLICATION FILED SEPT. 1, 1909.

998,924.

Patented July 25, 1911.

2 SHEETS—SHEET 2.

Witnesses:
John Enders
Chas. H. Buell

Inventor:
Ira D. Powell.
By Dyrenforth, Lee, Chritton & Wiles,
Attys.

UNITED STATES PATENT OFFICE.

IRA D. POWELL, OF FOREST PARK, ILLINOIS.

ELBOW-FORMER ATTACHMENT FOR PIPE-VISES.

998,924.  Specification of Letters Patent.  Patented July 25, 1911.

Application filed September 1, 1909. Serial No. 515,585.

*To all whom it may concern:*

Be it known that I, IRA D. POWELL, a citizen of the United States, residing at Forest Park, in the county of Cook and State of Illinois, have invented a new and useful Improvement in Elbow-Former Attachments for Pipe-Vises, of which the following is a specification.

My object is to provide an attachment for, or an adjunct applicable to, pipe-vises which, while permitting the vise to be employed for all usual purposes, operates as a former for use in bending or forming accurate curves in metal pipes or tubes. Electrical workers, for example, require in the performance of their work a pipe-vise for holding conduit pipes while they are being cut, threaded, or operated upon in other ways, and they also require a pipe-bender or elbow-former by means of which the curves in its conduits may be formed of the required radius without flattening or crimping the tubes. Hitherto pipe-vises and pipe-benders have been provided as separate devices, while my invention contemplates combining both in one structure with attendant economy and advantages in one.

Figure 3:
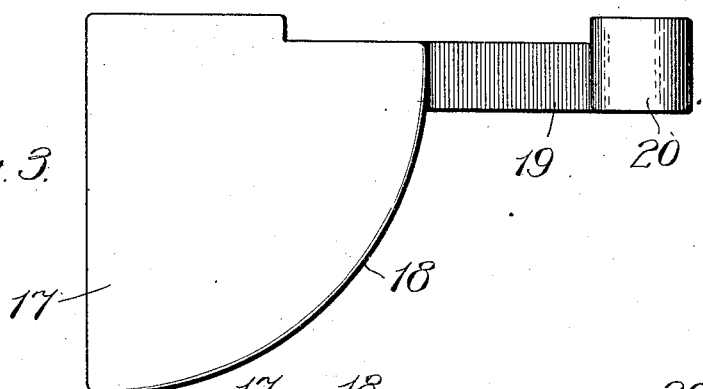
Figure 4:
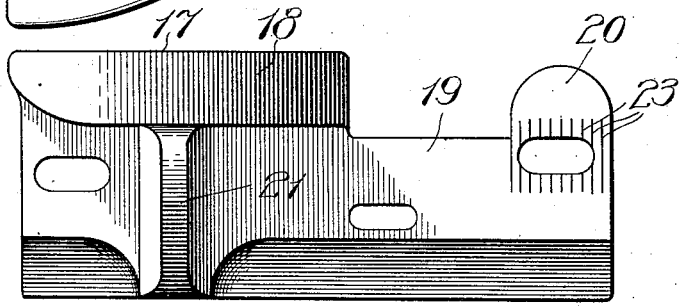
Figure 5:
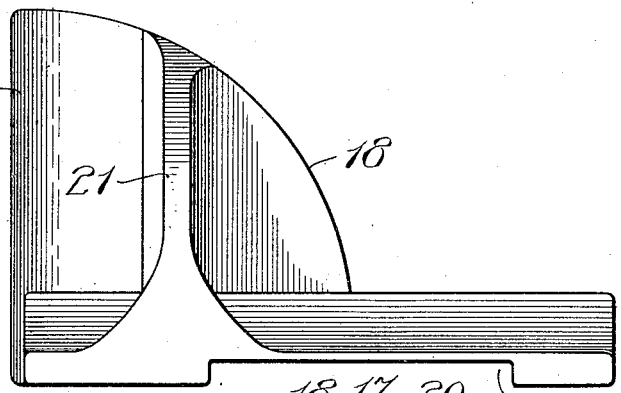
Figure 6:
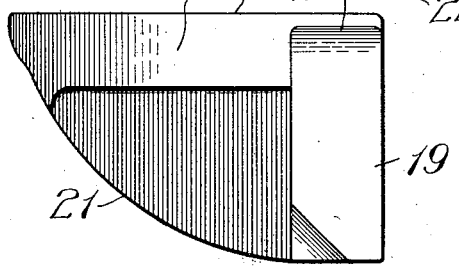

In the accompanying drawings—Figure 1 is an elevation of a common form of pipe-vise provided with my improved attachment showing the manner in which a pipe is bent in the device; Fig. 2, a top plan view of the same and Fig. 3 a top plan view; Fig. 4 an elevation of the attaching side; Fig. 5 a bottom plan view, and Fig. 6 an end elevation of my improved attachment.

The pipe-vise shown is of a well-known standard construction having a base-plate 7, at which it may be bolted to the work-bench, and a U-frame 8, in which the screw 9 works and forms a guide for the cross-head 10 to which the upper serrated gripping-block 11 is bolted. The U-frame is hinged to the base upon a bolt 12 passing through a lug which is integral with the base at one side; and at its opposite side the U-frame is engaged by the swinging latch 13 pivoted upon a bolt 14 passing through a lug or pair of companion lugs also integral with the base. The base with its lugs form V-shaped forward and rear seats for a stationary pair of lower serrated gripping-blocks 15 held by the bolt 16.

For the purpose of my attachment, the only change necessary in the above described standard pipe-vise is bolts 12, 14 and 16 of greater length than hitherto necessary in this connection.

My elbow-former attachment is in the form of a casting having a platform portion 17 with a segmental edge or bend-shaping face 18 curved in the arc of a circle of desired radius. Integral with the platform is a plate or bar portion 19 carrying the integral lug 20. Extending from the bar portion 19, at right-angles thereto, beneath the platform and integral with the bar and platform is a strengthening rib 21. The outer side of the bar-portion fits against the base of the vise and is cut away as indicated at 22 to clear the adjacent block 15. In the bar-portion 19 are bolt openings registering with the bolts 12, 14 and 16, the openings being elongated in the horizontal plane to permit the attachment to be shifted. In applying my apparatus to a vise, it is passed at its bolt-openings over the said bolts and properly connected. If, for example, a one inch pipe is to be operated upon, the attachment will be positioned with the initial end of the curved-surface 8 one half an inch from the center of the vise and fastened rigidly in its adjusted position by tightening the nuts upon the bolts 12, 14 and 16. As a further means for holding the attachment in adjusted position, the face of the lug 20 is provided with serrations 23 and the bolt 12 carries a washer 24 having a serrated face to engage the serrations 23.

The rules require that the elbows of electric-wire conduits in buildings shall describe curves of arcs of circles of not less than a certain radius, depending upon the diameter of the tube. In practice, I provide my attachments with curved faces 18 of a size adapting the attachment for use in forming elbows in conduits of the largest diameter used in a certain class of work, say from ¾ inch to an inch in diameter.

The attachment is comparatively inexpensive and for conduits or tubes of greater diameter requiring that they be bent in the arc of a larger circle, the attachment may be replaced by a similar attachment presenting a surface 18 of a larger curve.

The construction shown may be variously modified, of course, to adapt it for attachment to pipe-vises, of a different construction from that illustrated, without departing from the spirit of my invention as defined by the claim.

What I claim as new and desire to secure by Letters Patent is—

In combination with a vise, a supplemental plate attached thereto and having formed integrally therewith a former block adjacent the jaws of the vise and adjustable in line with the opening of said jaws, whereby a pipe may be grasped by the vise jaws and shaped about the former, as set forth.

IRA D. POWELL.

In presence of—
R. A. SCHAEFER,
JOHN WILSON.

Copies of this patent may be obtained for five cents each, by addressing the "Commissioner of Patents, Washington, D. C."